April 19, 1960  E. E. HOLLINGWORTH ET AL  2,933,027
CAMERA
Filed Oct. 5, 1951  4 Sheets-Sheet 1

INVENTOR.
Edward E. Hollingworth
Arthur W. Beaurline
Robert M. Dunning
ATTORNEY

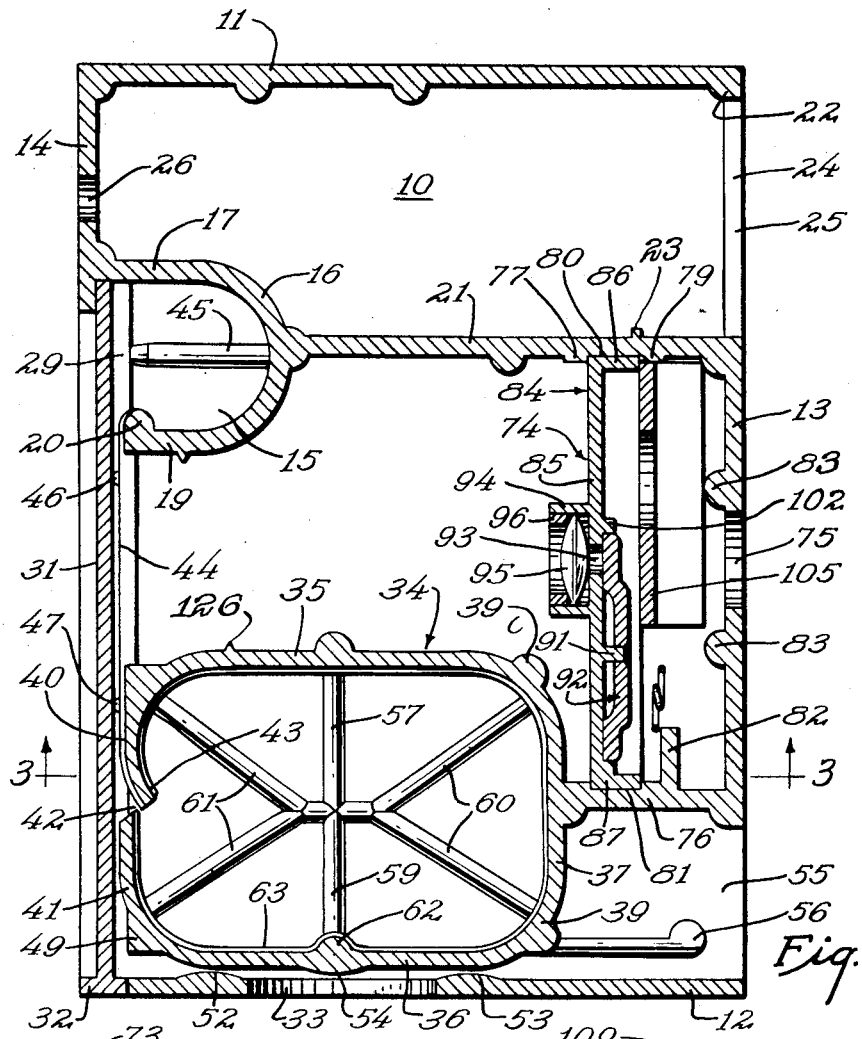
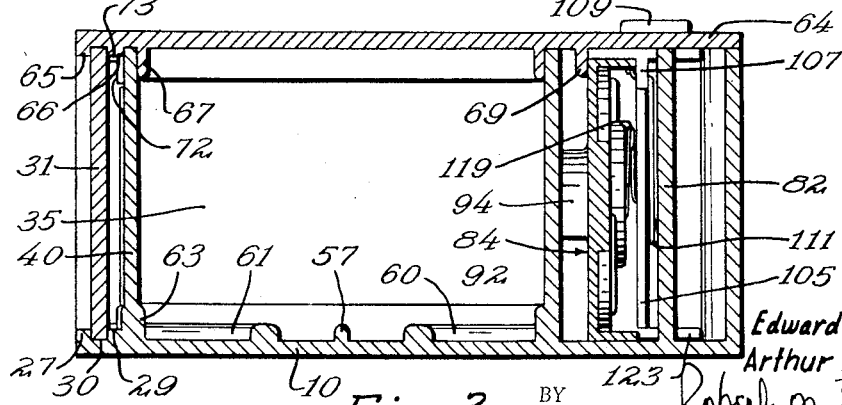
Fig. 2
Fig. 3
INVENTOR
Edward E. Hollingworth
Arthur W. Beaurline
BY Robert M. Dunning
ATTORNEY April 19, 1960 E. E. HOLLINGWORTH ET AL 2,933,027
CAMERA
Filed Oct. 5, 1951 4 Sheets-Sheet 3
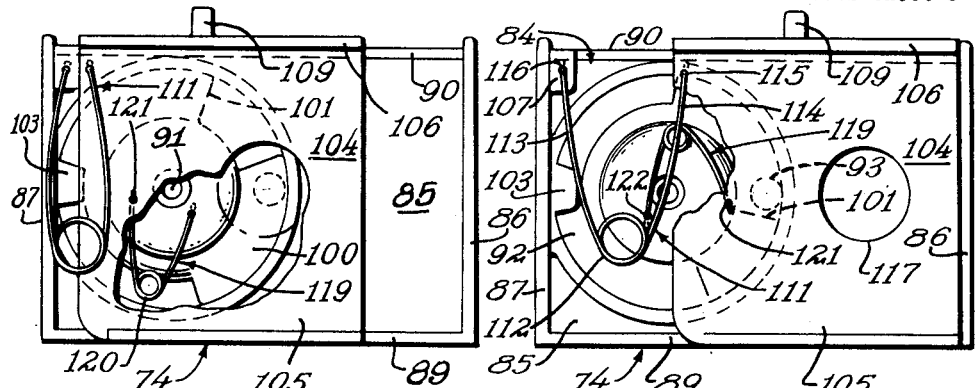
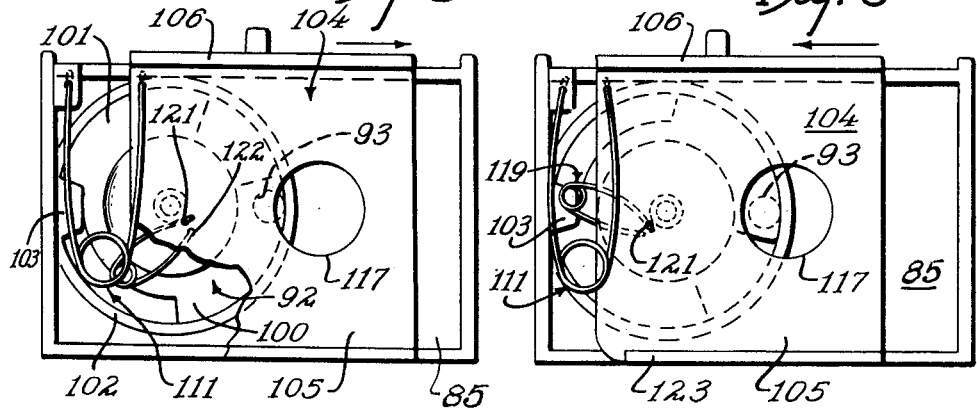
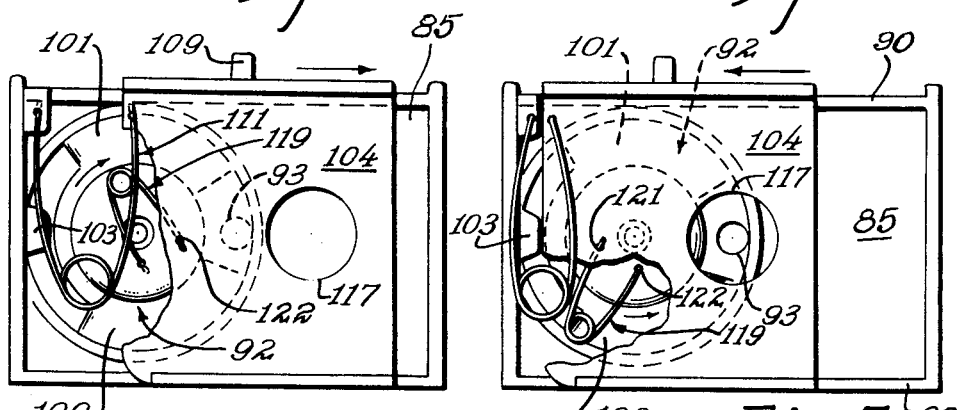
INVENTOR
Edward E. Hollingworth
Arthur W. Beaurline
BY Robert M. Dunning
ATTORNEY April 19, 1960  E. E. HOLLINGWORTH ET AL  2,933,027
CAMERA
Filed Oct. 5, 1951  4 Sheets-Sheet 4
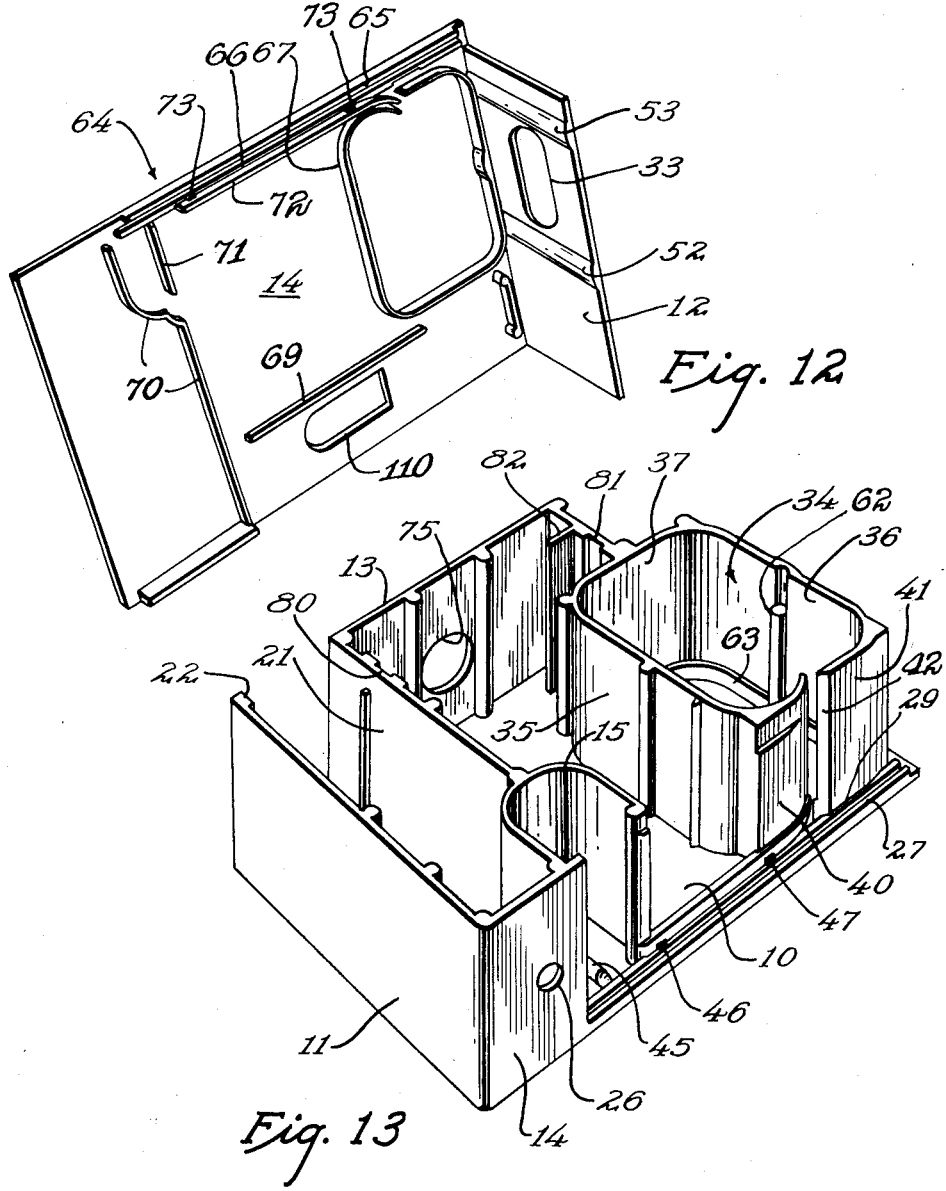
INVENTOR
Edward E. Hollingworth
Arthur W. Beaurline
BY Robert M. Dunning
ATTORNEY

United States Patent Office 2,933,027
Patented Apr. 19, 1960

2,933,027

CAMERA

Edward E. Hollingworth, St. Paul, Minn., and Arthur W. Beaurline, Lyons, Ill., assignors to Beaurline Industries, Inc., St. Paul, Minn., a corporation of Minnesota Application October 5, 1951, Serial No. 249,828

6 Claims. (Cl. 95—31)

This invention relates to an improvement in cameras and deals particularly with a camera which may be produced at low cost.

In recent years cameras have been produced which are sold with a roll of film already in place in the camera and which may be sent complete to a processor for development and printing of the pictures. The processing company for a reasonable price, develop and print the pictures and return a loaded camera to the owner. Thus with a small investment a purchaser may eliminate the difficulty and nuisance of inserting films in place, removing them from the camera after use, and taking them to a processor for development and finishing.

An object of the present invention lies in the provision of a camera which can be molded of plastic or other suitable material at relatively low cost. The camera is almost entirely made up of plastic parts, each of which may be molded either single or in clusters. Thus the entire unit may be made at an extremely low cost and the resultant product is sturdy and relatively non-breakable.

A feature of the present invention resides in the provision of a camera provided with film tracks which permit the film to travel with very little friction. Means are provided for keeping the major portion of the body of the film strip out of contact with the camera parts during movement of the film so as to minimize injury to the film strip and to virtually eliminate the chance of having the film stick or jam in operation.

An added feature of the present invention resides in the provision of a camera having a film receiving chamber which is generally rectangular in shape. This rectangular shape of the receiving chamber has been found definitely advantageous over cameras having other forms of receiving chambers, such as circular or cylindrical chambers and it is found that the film may be controlled more uniformly with the particular type of chamber employed than with chambers of other types.

Another feature of the present invention resides in the provision of means for holding the film from lateral movement with a minimum of friction. Means are provided which engage the film strip at longitudinally spaced points to hold the film strip from lateral movement. These spaced means are rounded so as to minimize friction upon the film and by spacing the film engaging means apart, the friction is also substantially reduced.

Another feature of the present invention lies in the provision of a camera useful in handling film which includes a film strip and a backing strip which is separable from the film strip. By pulling upon the backing strip the film may be moved from the magazine into the receiving chamber. Means are provided for producing a greater friction against the backing strip than against the film strip so that movement of the backing strip insures movement of the film strip.

An added feature of the present invention resides in the provision of a camera which includes light traps requiring the light to travel a tortuous path to enter the camera. The various openings in the camera are all trapped by suitable means to prevent the leakage of light into the camera.

An important feature of the present invention resides in the provision of a simple and effective shutter mechanism. The shutter mechanism is extremely simple in form and yet provides a timed interval during which the film may be exposed. The shutter mechanism is composed of three plastic parts which interfit together without the use of special fastening means. The shutter parts are moved between their extreme positions by two springs which insure a similar time interval for each exposure. One of the springs acts upon a rotary disc type shutter and exerts a substantially constant force for moving the shutter regardless of the speed with which the shutter operating mechanism is actuated manually.

These and other objects and novel features of the present invention will be more clearly and fully set forth in the following specification and claims.

In the drawings forming a part of the specification:

Figure 2 is a sectional view through the camera showing the arrangement of parts therein.

Figure 3 is a sectional view transversely through the camera, the position of the section being indicated by the line 3—3 of Figure 2.

Figure 4 is a sectional view through the shutter mechanism to show the arrangement of parts therein.

Figure 1:
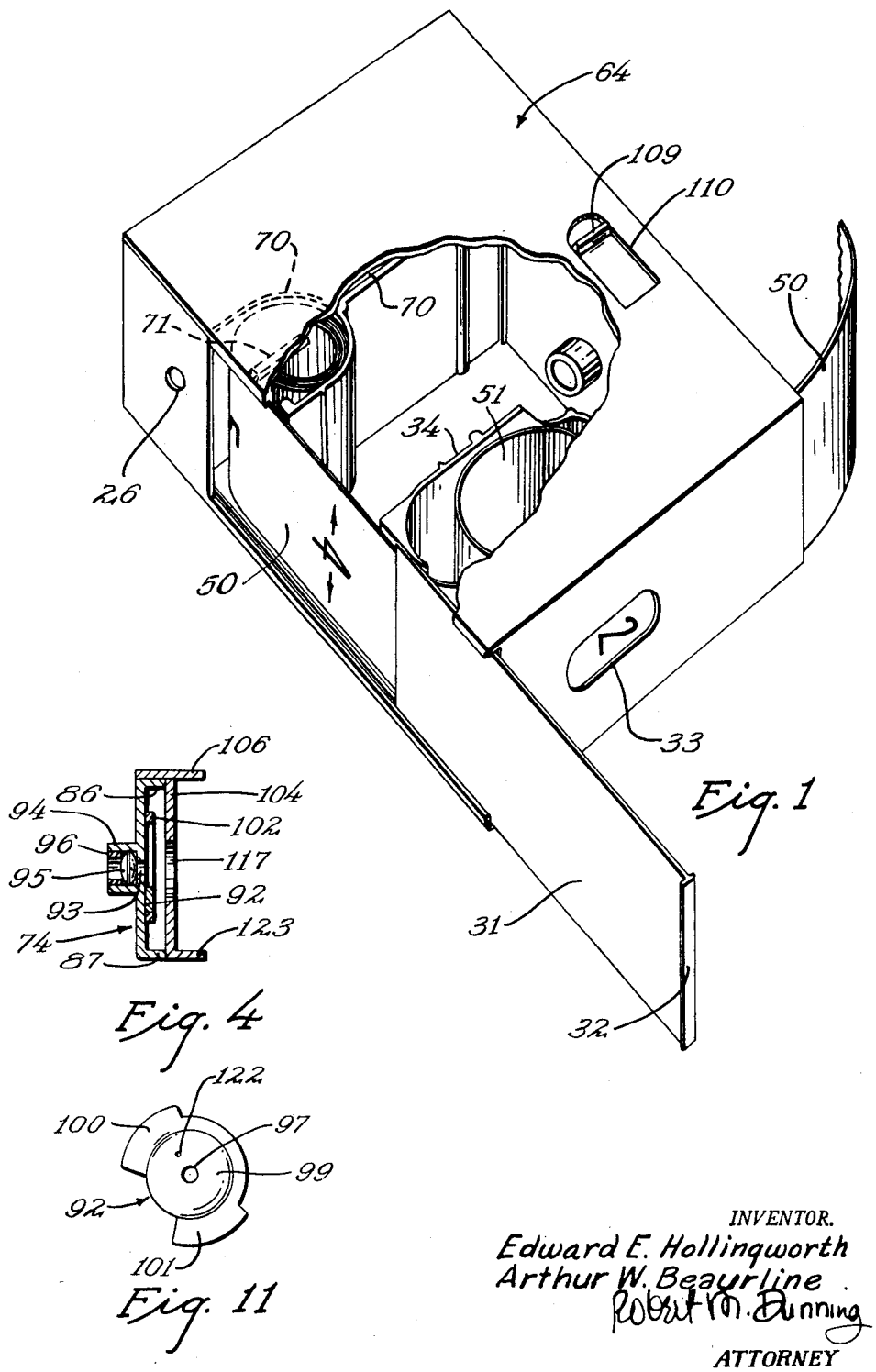
Figure 1 is a perspective view of the camera, the casing being partially broken away and partially removed for the purpose of illustrating the construction thereof.

Figures 5, 6, 7, 8, 9 and 10 all show the shutter mechanism and the various steps of movement in the operation thereof.

Figure 11 is an elevation view of the rotating part of the shutter mechanism.

Figure 12 is a perspective view of the cover member removed from the camera body.

Figure 13 is a perspective view of the camera body with the cover member, closure panel, and shutter mechanism removed.

The camera comprises a generally rectangular box-like structure preferably formed of plastic or similar material. The camera includes a body portion having a side wall 10, a top wall 11, a bottom wall 12, and a front wall 13. A rear wall portion 14 is also provided adjoining the top wall 11 of the camera.

As indicated in Figures 1 and 2 of the drawings, the camera casing includes a film magazine 15 which is defined by a generally semi-cylindrical wall 16 projecting from the side wall 10. The upper edge of the semi-circular wall 16 is joined by a relatively straight wall 17 to the wall portion 14. A parallel straight wall portion 19 adjoins the lower portion of the semi-circular wall 16 and terminates in an upwardly directed marginal flange 20.

A partition wall 21 extends from the center of the semi-circular wall 16 to the front wall 13 of the camera. The portion of the front of the camera between the partition wall 21 and the top wall 11 of the casing remains open with the exception of a relatively short marginal flange 22 projecting downwardly from the top wall 11 and a similar upwardly directed flange 23 on the partition wall 21. A relatively short marginal flange 24 similarly projects from the side wall 10. While these relatively short flanges 22, 23, and 24 are not essential in the camera, they act to frame the sight opening 25 between these flanges and reduce light reflection on the inner walls of the casing.

A sight opening 26 is provided in the rear wall portion 14. This opening 26 has its axis slightly above the center of the sight opening 25 in the forward wall of the camera to correct for parallax. By looking through the sight opening 26 and the aligned opening 25, the object being photographed may be located.

As indicated in Figure 3 of the drawings, a pair of spaced ribs 27 and 29 are provided on the side wall 10 and are provided with a groove 30 therebetween. A slide 31 which acts as a closure for the rear wall of the camera is slidably engaged between the ribs 27 and 29. The slide 31 is provided with a flanged end 32 which limits the movement of the slide and forms a continuation of the lower wall 12 of the camera housing.

As indicated in Figures 1 and 2 of the drawings an elongated slot or aperture 33 is provided in the bottom wall 12 of the camera. This slot provides a means through which indicating numerals or indicia on the film backing strip may be observed as will be later described.

A film receiving magazine 34 projects from the side wall 10. This chamber 34 is generally rectangular in form and includes an upper wall 35, a lower wall 36 and a forward end wall 37. These walls are connected by rounded connecting corners 39. The rear wall of the chamber 34 is divided into an upper wall portion 40 and a lower wall portion 41. These portions 40 and 41 are slightly spaced to provide a film passage opening 42 therebetween. The lower end of the uper wall portion 40 is curved downwardly and inwardly as indicated at 43 so that the film strip may be guided through the slot 42 and into the film receiving chamber 34. The inner surface of the upper wall portion 40 also tends to guide the film strip away from the slot 42 to prevent binding of the end of the film against the portion of the film entering the slot 42.

A guide track 44 extends from the flange 20 forming a part of the film magazine to the slot 42. This track 44 engages the forward side of the film near the edges thereof and prevent the central portion of the film from contacting the housing. It will be noted that the track 44 acts to prevent the emulsion surface of the film from contacting the wall portion 40 of the film receiving chamber and also spaces this side of the film from the flange 20. Thus the center portion of the film does not come in contact with any surface by which it may be marred during the travel of the film.

A rib 45 projects from the casing side wall 10 to engage against the marginal edge of the film roll within the magazine 15. A pair of lugs or humps 46 and 47 project forwardly from the track 44 to engage the side edge of the film. Thus the film is guided by the rib 45 and the hump or projections 46 and 47 to exert a minimum of friction upon the edges of the film.

The outer corner 49 of the film receiving chamber 34 is but slightly rounded and is almost right angular in form. As a result friction is exerted upon the backing strip such as 50 used to move the film strip 51. A pair of transverse ribs 52 and 53 project upwardly from the bottom wall 12 and a rib 54 projects downwardly between these ribs 52 and 53 from the lower wall 36 of the film receiving chamber. The film backing strip 50 must pass over the rib 52, under the rib 54 and over the rib 53 so as to frictionally engage the fim backing strip and hold it in adjusted position. The rib 54 also serves the purpose of holding the film strip closely adjacent the sight opening 33 and in providing an abutment against which a finger or thumb of the operator may press the film backing strip during the severing of the end of the backing strip. The backing strip usually extends over the bottom wall 12 of the camera casing and through the opening 55 in the forward wall of the camera between the lower end of the front wall 13 and the wall 12. The end of the backing strip may be torn off from time to time by pulling the strip against the forward end of the lower wall 12 while holding the backing strip from longitudinal movement by pressure of a finger or thumb through the aperture 33.

A rib 56 projects from the wall 10 forwardly of the chamber 34 into close proximity with the front wall of the camera casing. This rib acts as a guide for the backing strip so that it will not curl upwardly in the space forwardly of the receiving chamber.

A rib structure is provided to hold the marginal edge of the film strip spaced from the wall 10 within the receiving chamber 34. A pair of opposed vertically extending ribs 57 and 59 extend from top to bottom of the chamber while connected diagonally extending ribs 60 extend toward the forward end of the casing and similarly diagonally extending rib 61 extends toward the rear end of the chamber. These ribs engage the film at longitudinally spaced points to hold the film strip away from the walls and to reduce friction.

An inwardly extending indentation 62 is provided in the lower wall 36 of the chamber 34 in the path of movement of the film strip. This projection tends to direct the film upwardly so that it does not cling closely to the outer wall of the chamber 34. By directing the film over this projection 62, the major portion of the film is held in spaced relation to the outer walls of the housing and the forward end of the film strip tends to bend upwardly before actual contact with the forward wall 37 of the receiving chamber. A marginal flange 63 is provided adjacent the wall 10 about the entire periphery of the chamber so as to hold the center portion of the film strip at all times in spaced relation to the receiving chamber walls.

The housing is closed by means of a cover plate which is indicated in general by the numeral 64. This cover plate 64 is designed to fit snugly against the various walls of the body portion of the camera and interlock therewith to form a substantially light proof housing. The cover plate 64 is indicated in Figures 1 and 12 of the drawings and includes a pair of spaced ribs 65 and 66 in opposed relation to the ribs 27 and 29 to accommodate an edge of the closure slide 31. The cover plate is also provided with an inwardly projecting flange 67, which follows the contour of the receiving chamber walls and telescopes thereinto. The flange 67 forms a marginal track for the edge of the film similar to the track 63 adjacent the casing wall 10. This flange 67 cooperates with the track 63 to hold the center portion of the film from contact with the walls of the housing.

The cover plate 64 is also provided with a vertically extending flange 69 which engages inwardly of the shutter mechanism and prevents light from entering the interior of the camera. An inwardly extending flange 70 also is provided on the cover panel and follows the contour of the upper surface of the partition wall 21. This flange 70 also follows the contour of the rounded wall 16 and the straight wall extension 17. An inwardly projecting flange is also provided opposite the flange 24 projecting into the opening 25 to decrease the reflection of light on the inner walls of the camera.

The cover plate 64 is also provided with a short flange 71 projecting inwardly opposite to the rib 45 on the wall 10. A track 72 leads from the film magazine to the film receiving chamber 34 and this track is provided with spaced projections 73 identical to the projections 46 and 47. These projections are of the same elevation as the rib 71 and provide a guide against the edge of the film strip which minimizes friction upon the film strip.

A shutter mechanism is provided for admitting light momentarily to expose the film. The shutter mechanism is indicated in general by the numeral 74. This shutter mechanism is provided inwardly of the front wall 13 of the camera, this front wall being apertured as indicated at 75 to permit light to pass through the front wall of the camera. A short partition wall 76 joins the lower end of the front wall 13 with the forward wall 37 of the film receiving chamber 34. The shutter mechanism is supported between the partitions 21 and 76 and between the wall 10 and the cover panel 64.

As indicated in Figure 2, a pair of spaced ribs 77 and 79 define a channel 80 for accommodating one portion of the shutter mechanism. A similar opposed groove 81 is provided in the opposite wall of the partition member 76. An upwardly directed flange 82 is provided on the partition 76 extending toward the upper partition member 21. A pair of transverse ribs 83 extend inwardly from the front wall 13 and act as guides for guiding the movement of the slidable portion of the shutter mechanism.

The shutter mechanism is formed in two parts which are shown in section in Figures 2, 3, and 4 of the drawings, and which are shown in elevation in Figures 5 through 10 of the drawings. Both of the main parts of the shutter mechanism are removable from the camera when the cover plate 64 is removed, but one part is normally stationary when in place. The part 84 of the shutter mechanism is slidably engaged in the grooves 80 and 81 and comprises a panel 85 having end flanges 86 and 87 which extend the full depth between the wall panel 10 and the cover plate 64. As indicated in Figures 5 through 10 of the drawings the panel 85 also includes marginal flanges 89 and 90. The flange 89 is flush with the ends of the flanges 86 and 87 while the flange 90 is recessed slightly below the ends of the flanges 86 and 87.

The panel 85 is provided with an integral post 91 projecting therefrom to act as a pivot support for a rotary shutter member 92. The post 91 normally extends through an aperture in the center of the rotary shutter member 92 and is riveted over at its outer extremity by heat, pressure, or a combination thereof. The panel 85 is provided near its center point with a light aperture 93 which is centered with the light aperture 75.

An integral ring shaped boss 94 encircles the aperture 93 and projects inwardly toward the interior of the camera therefrom. A lens 95 is provided within the boss 94. A retaining ring 96 is pressed into the boss 94 to hold the lens 95 in place. The shutter member 92 is best illustrated in Figure 11 of the drawings. This shutter member is provided with a central aperture 97 which accommodates the pivot post 91. The shutter includes a generally circular central portion 99 with a pair of outwardly projecting segments 100 and 101 extending beyond the periphery thereof. These segments are of proper diameter to cover the aperture 93 in certain rotative positions of the shutter member. The central circular portion 99 is not of sufficient diameter to extend over the sight opening.

The outer surface of the panel 85 is provided with a ring-shaped boss 102 which has an inner diameter slightly greater than the outer diameter of the shutter member projections 100 and 101. This boss 102 is arranged to form a light baffle encircling the shutter member and is concentric with the pivot 91. A stop shoulder 103 is provided on the panel 85 projecting inwardly from the boss 102. This stop shoulder 103 is designed to engage against either segment of the shutter member 92 to limit the rotative movement in both directions.

A slidable element 104 forms the second main part of the shutter 84. This slidable member 104 includes a panel 105 which engages against the flanges 89 and 90 of the shutter member 84. This panel 105 is provided with a marginal edge panel 106 integral therewith and projecting on both sides thereof. One side of the panel 106 is designed to overlie the flange 90 of the shutter member 84 and rest thereagainst. The ends of the panel 106 may abut against the projecting end of the flange 86 to limit movement of the shutter member 104 in one direction. An edge of the panel 105 may abut against a lug 107 on the flange 87 to limit movement of the shutter member 104 in the opposite direction. A web or rib 109 projects normally from the panel 106 and extends through a slot or aperture 110 in the cover panel 104 as indicated in Figure 1 of the drawings. The movable shutter member 104 may be moved by means of this web 109.

A spring 111 is provided with a center loop 112 and a pair of normally diverging arms 113 and 114. One of these arms includes a right angularly bent extremity extending through a hole 115 in the movable shutter member 104. The arm 113 is provided with a right angularly bent end which engages in a hole 116 in the lug 107. The spring 111 normally urges the movable shutter member 104 against the flange 86 of the shutter member 84 as indicated in Figure 5 of the drawings. The panel 105 is provided with an aperture 117 therein which in one position of the slidable shutter member is laterally off-set from the light aperture 93 and which in its other extreme position is aligned with the light aperture 93.

A second spring 119 connects the movable shutter member 104 with the rotatable shutter member 92. The spring 119 is provided with a center loop 120 and a pair of normally diverging arms, one of which includes a right angularly bent arm which extends through an aperture 121 in the movable shutter member 104. The other arm of the spring 119 is provided with a right angularly bent end which is engaged in an aperture 122 in the rotatable shutter member 92. This spring 119 is designed to rotate the rotatable shutter member 92 upon slidable movement of the movable shutter member 104 as will be later described.

The movable shutter member 104 is provided with a marginal flange 123 extending along the side opposite the panel 106. This flange 123 is designed to slide along the panel 10 and to form a bearing for the movable shutter member. The panel 106 slides along the inner surface of the cover member 64 and forms a light baffle for the slot 110 and permits the entry of light therethrough into the interior of the camera.

The operation of the shutter mechanism is as follows: The stationary part 84 of the shutter mechanism supports the rotary shutter member 92 which normally is in position to close the light aperture 93. Figure 5 of the drawings shows the rotary shutter element 92 with the segment 100 abutting the stop 103 and with the segment 101 closing the light aperture 93. In this position the aperture 117 in the movable shutter member 104 is laterally off-set from the light aperture 75 in the outer casing as will be noted from Figure 2 of the drawings. Reflected light is trapped from entering the light aperture 93 by the ring shaped boss 102 encircling the rotary shutter 92.

When the web 109 is moved downwardly in the slot 110 by the thumb or finger of the photographer, the movable shutter member 104 moves into the position shown in Figure 6 of the drawings, the spring 111 compressing during this movement. As the aperture 117 moves into registry with the light aperture 93 as shown in Figure 6, the arms of the spring 119 move toward one another until the ends of the two arms are substantially aligned. As the aperture 121 passes by the aperture 122 the spring 119 swings downwardly and the tension of the spring causes it to rotate the rotatable shutter member 92 from the starting position shown in Figure 6 to the open position shown in Figure 7. The spring 119 continues acting upon the rotary shutter member 92 until the segment 101 strikes the fixed shoulder 103 and stops further rotation. At this point of the operation the segment 100 of the rotary shutter covers the light aperture 93 and prevents further light from passing therethrough.

Figure 8 shows the movable shutter member in its extreme position. When the web 109 has been drawn downwardly into the position shown in Figure 8 the web is released so that the spring 111 is free to return the movable shutter member to starting position. As the movable member 104 moves to the right from the position illustrated in Figure 8 to the position shown in Figure 9, the aperture 117 passes the aperture 93 before the ends of the spring 111 pass each other. Accordingly the light aperture 93 is out of registry with the aperture 117 before the spring 111 rotates the movable shutter member 92 in a reverse direction. When the movement of the shutter member 104 is sufficient to move the aperture 121 past the aperture 122 the spring 111 acts in a reverse direction to rotate the rotatable shutter member 92 into the position shown in Figure 5.

Figure 10 illustrates an intermediate position in which the rotary shutter is not in either extreme position. This figure is shown in order to show that the apertures 117 and 93 are out of registry when the light aperture 93 is uncovered by the rotary shutter member 92 so that during the reverse rotation of the shutter member no direct light may enter the light aperture 93.

The manner in which the camera is constructed has been disclosed, and the operation of the shutter mechanism has been described in detail. Means are provided to prevent reflected light from interfering with the camera operation. A rib 23 is provided extending upwardly from the partition 21. This rib 23 prevents light entering the opening 25 and being reflected by the upper surface of the partition, and interfering with the use of the finder. A rib 126 is also provided on the upper wall 35 of the compartment 34 to prevent light entering the aperture 75 from reflecting against the film being exposed. The camera is extremely effective, in spite of its simplicity of construction.

In accordance with the patent statutes, we have described the principles of construction and operation of our camera, and while we have endeavored to set forth the best embodiment thereof, we desire to have it understood that obvious changes may be made within the scope of the following claims without departing from the spirit of our invention.

We claim:

1. A camera for use with a film having a backing strip, a generally rectangular camera casing having opposed side walls, a front wall, a top wall, a bottom wall, and a removable rear wall, a film magazine having a rear opening providing access to the film magazine when said rear wall is removed, a narrow film slot between the rear bottom edge of said film magazine and said rear wall, an exposed film receiving chamber connecting said side walls, said film receiving chamber being defined by a peripheral wall including a rear portion generally parallel to and slightly spaced from said rear wall and including a bottom wall portion generally parallel to, and spaced from, said bottom wall, a film slot in said rear portion between the top and bottom thereof, the spacing of said peripheral wall from the rear and bottom casing walls forming a guide passage for the backing strip, and said front wall having an opening therethrough in communication with the guide passage and through which the backing strip may extend, a partition extending from said film receiving chamber and said front wall, a second partition extending from said film magazine to said front wall, said partition walls extending from one side wall to the other and combining with said front wall and rear wall to provide an exposure chamber, said front wall having a lens opening therein forwardly of said exposure chamber, and a shutter mechanism supported between said partition walls adjacent said front wall and normally closing said lens opening.

2. The structure of claim 1 and in which the peripheral wall defining said film receiving camera includes a substantially square corner between said rear portion and said bottom portion around which said backing strip, but not said film, extends, said corner acting as a brake to resist free movement of said backing strip.

3. The structure of claim 1 and including a slot in said bottom wall adjoining said bottom wall portion of said film receiving chamber, a transverse downwardly projecting rib on said bottom wall portion opposite said slot, and upwardly projecting transverse ribs on said bottom wall on either side of said slot, said ribs bending the backing intermediate the ends of said slot.

4. The structure of claim 1 and in which the said front casing wall has a substantially rectangular opening therein above said partition connecting said film magazine and said front wall, and said rear wall having a sight opening therethrough above said film magazine and substantially centrally located opposite said rectangular opening.

5. A camera including in combination, a casing having a front wall, a rear wall, and parallel side walls, a film magazine connecting said side walls and contacting said rear wall along the upper edge thereof, a casing wall connecting said side walls and connecting said film magazine and said front wall, a film receiving chamber connecting said side walls and having peripheral walls spaced from said rear wall to provide a film passage therebetween, said peripheral walls having a film slot therein connecting said film passage with the interior of said film receiving chamber, a stationary partition wall parallel to, and spaced from, said front wall, a lens supported thereby, a lens opening in said front wall aligned with said lens, a shutter support slideably supported between said partition and said front wall for movement between two extreme positions, said shutter support having an opening therethrough aligned with said lens and opening in one extreme position thereof, a pivotal shutter pivotally supported by said shutter support to oscillate between two extreme positions, resilient means urging said shutter support toward its other extreme position and resilient means connecting said shutter and said shutter support to rotate said shutter from one extreme position to the other when said opening in said shutter support is aligned with said lens and said opening in said front wall, said shutter uncovering said opening in said shutter support at a position between its extreme positions.

6. The structure of claim 5 and in which the resilient means connecting the shutter and said shutter support oscillate said shutter in a reverse direction after said shutter support returns to said other extreme position.

References Cited in the file of this patent

UNITED STATES PATENTS

| | | |
|---|---|---|
| 1,275,230 | Dolby | Aug. 13, 1918 |
| 2,000,588 | Fuerst | May 7, 1935 |
| 2,020,384 | Stone | Nov. 12, 1935 |
| 2,292,218 | Drotning | Aug. 4, 1942 |
| 2,320,423 | Githens | June 1, 1943 |
| 2,506,484 | Bierhorst | May 2, 1950 |
| 2,514,669 | Pribus | July 11, 1950 |
| 2,527,067 | Lessler | Oct. 24, 1950 |
| 2,531,936 | Fairbank et al. | Nov. 28, 1950 |
| 2,537,905 | Mihalyi | Jan. 9, 1951 |
| 2,548,549 | Mihalyi | Apr. 10, 1951 |
| 2,548,924 | Weir | Apr. 17, 1951 |
| 2,557,297 | Lea | June 19, 1951 |
| 2,633,065 | Perlin | Mar. 31, 1953 |
| 2,694,955 | Foster | Nov. 23, 1954 |

FOREIGN PATENTS

| | | |
|---|---|---|
| 603,243 | France | Jan. 7, 1926 |
| 265,218 | Great Britain | July 14, 1927 |